United States Patent [11] 3,624,253

[72] Inventor Chester E. Pawloski
 Bay City, Mich.
[21] Appl. No. 16,977
[22] Filed Mar. 5, 1970
[45] Patented Nov. 30, 1971
[73] Assignee The Dow Chemical Company
 Midland, Mich.

[54] HEXAMETHYLENETETRAMINE ADDUCTS WITH HALOACETIC ACID ESTERS
 9 Claims, No Drawings
[52] U.S. Cl. ........................................................ 260/248.5,
 424/249
[51] Int. Cl. ........................................................ C07d 55/14

[50] Field of Search ............................................ 260/248.5

[56] References Cited
 UNITED STATES PATENTS
3,524,854  8/1970  Kuhn ............................ 260/248.5

Primary Examiner—John M. Ford
Attorneys—Griswold and Burdick and C. E. Rehberg

ABSTRACT: New compositions are made by the 1:1 molar reaction of hexamethylenetetramine with a haloacetic acid ester. The quaternary salts thus formed are colorless crystalline solids, readily soluble in water and having biological activity. They are bactericides which also have fungicidal activity.

HEXAMETHYLENETETRAMINE ADDUCTS WITH HALOACETIC ACID ESTERS

BACKGROUND OF THE INVENTION

Hexamethylenetetramine is known to form quaternary salt adducts with certain halohydrocarbons (Wolf and Scott, U.S. Pat. No. 3,228,829). These adducts show bactericidal and other biological activity.

SUMMARY OF THE INVENTION

New, biologically active quaternary salts are made by the reaction of hexamethylenetetramine (hereinafter, HMTA) with haloacetic acid esters in a 1:1 molar ratio. These salts are colorless, water-soluble, stable, crystalline compounds having high activity as bactericides as well as other biological activity. These compounds have the formula

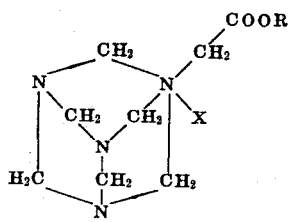

wherein X is Br or I and R is lower alkyl, alkenyl, haloalkenyl or alkynyl containing up to four carbon atoms.

The above compounds are conveniently made by contacting HMTA and the appropriate haloacetic acid ester in a suitable inert solvent. The products are insoluble in most common organic solvents; hence, they precipitate from such solvents as they are formed. Suitable such solvents include the halohydrocarbons such as methylene chloride, chloroform, perchloroethylene and the like.

SPECIFIC EMBODIMENTS OF THE INVENTION

A. Preparation of Compounds, General Procedure

Essentially equimolar amounts of HMTA and haloacetic acid ester dissolved in chloroform, about 1.5–2.5 l. of the latter being used per g. mole of HMTA. The solutions were stirred at or slightly above room temperature for 3–6 hr., though the reaction appeared to be complete in less time. The products precipitated as colorless crystals as the reaction proceeded. The addition of acetone sometimes favored complete precipitation. The crystals were separated by filtration and dried in vacuum. No attempt was made to recover product or unused reactant from the filtrate. Results are tabulated below.

TABLE I

HMTA Salts of Formula I (X=Br)

| Example | R | % Yield | M.P., °C. |
|---------|---|---------|-----------|
| 1 | Methyl | 93 | 156(d) |
| 2 | Ethyl | 81 | 151 |
| 3 | 2-Propynyl | 89 | 149–50(d) |
| 4 | 2-Bromoallyl | 89 | 150–52(d) |
| 5 | Allyl | 57 | 158(d) |
| 6 | 2-Chloroallyl | 88 | 153–54(d) |

In addition to those shown in the above table, other similar salts that can be made in the same way and that have generally similar properties and uses include those wherein R is n-butyl, isobutyl, methallyl, 2,3-dichloroallyl, and the salts corresponding to those above wherein X is I.

The compounds of the invention have powerful biological activity. They are of especial interest as bactericides. Thus, the compounds of examples 1, 2, 4, 5 and 6, when incorporated into a typical agar culture medium at a level of 0.05 percent, was 100 percent effective in preventing the growth of such organisms as Pseudomonas aeroginosa, Staph. aureus, E. coli, B. subtilis, Aerobacter aerogenes and Salmonella typhosa.

The compound of example 3, in addition to being active against some of the above organisms, also showed activity against such diverse organisms as Pullularia pullulans, Rhizopus nigricans, dog hookworm, rice blast, corn, millet and sorghum.

I claim:

1. A compound having the formula

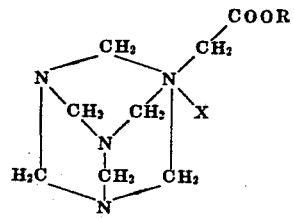

wherein X is Br or I and R is an alkyl, alkenyl, haloalkenyl or alkynyl group of up to four carbon atoms.
2. The compound of claim 1 wherein X is Br.
3. The compound of claim 1 wherein X is I.
4. The compound of claim 1 wherein R is alkyl.
5. The compound of claim 1 wherein R is alkenyl.
6. The compound of claim 1 wherein R is bromoalkenyl.
7. The compound of claim 1 wherein R is chloroalkenyl.
8. The compound of claim 1 wherein R is alkynyl.
9. The compound of claim 2 wherein R is methyl, ethyl, allyl, 2-bromoallyl, 2-chloroallyl or propynyl.

* * * * *